US009540225B2

(12) United States Patent
Ikushima

(10) Patent No.: US 9,540,225 B2
(45) Date of Patent: Jan. 10, 2017

(54) LIQUID MATERIAL DISCHARGE MECHANISM AND LIQUID MATERIAL DISCHARGE DEVICE

(71) Applicant: MUSASHI ENGINEERING, INC., Mitaka-shi, Tokyo (JP)

(72) Inventor: Kazumasa Ikushima, Mitaka (JP)

(73) Assignee: MUSASHI ENGINEERING, INC., Tokyo (JP)

( * ) Notice: Subject to any disclaimer, the term of this patent is extended or adjusted under 35 U.S.C. 154(b) by 29 days.

(21) Appl. No.: 14/384,919

(22) PCT Filed: Mar. 13, 2013

(86) PCT No.: PCT/JP2013/057060

§ 371 (c)(1),
(2) Date: Sep. 12, 2014

(87) PCT Pub. No.: WO2013/137339

PCT Pub. Date: Sep. 19, 2013

(65) Prior Publication Data

US 2015/0048120 A1 Feb. 19, 2015

(30) Foreign Application Priority Data

Mar. 15, 2012 (JP) ................................ 2012-059488

(51) Int. Cl.
*G01F 11/00* (2006.01)
*B67D 7/36* (2010.01)
(Continued)

(52) U.S. Cl.
CPC ............... *B67D 7/36* (2013.01); *B05C 5/0225* (2013.01); *B05C 11/1002* (2013.01); *B67D 7/62* (2013.01);
(Continued)

(58) Field of Classification Search
CPC ............... B67D 7/36; B67D 7/62; B67D 7/72; B67D 7/78; B05C 11/10; B05C 11/1002; B05C 5/00; B05C 5/0025; B05B 1/32
(Continued)

(56) References Cited

U.S. PATENT DOCUMENTS 6,089,413 A * 7/2000 Riney .................. B05B 7/0861 222/318
2005/0150449 A1* 7/2005 Matsunaga ............ B05B 9/005 118/300
(Continued)

FOREIGN PATENT DOCUMENTS

EP 1442798 A2 * 8/2004 ............ B05C 11/10
GB 336494 * 12/1929 ............ B05C 11/10
(Continued)

OTHER PUBLICATIONS

International Search Report dated Jun. 18, 2013, issued in corresponding application No. PCT/JP2013/057060.
(Continued)

*Primary Examiner* — Lien Ngo
(74) *Attorney, Agent, or Firm* — Westerman, Hattori, Daniels & Adrian, LLP

(57) ABSTRACT

The present invention provides a discharge mechanism has a drive unit that moves a rod reciprocally, and a discharge unit including a liquid chamber allowing the rod to pass therein and a valve seat communicated with a nozzle, the nozzle discharging a liquid mixed with solid particles with an operation of moving the valve seat and a tip of the rod relatively away from each other. The discharge unit includes an inflow path through which the liquid mixed with the solid particles flows into the liquid chamber, and an outflow path through which the liquid mixed with the solid particles in the liquid chamber flows out. The inflow path and the outflow path are connected in a V-shape, the liquid chamber is disposed in a valley portion of the V-shape, and the valve seat is disposed at a lower end of the V-shape.

24 Claims, 5 Drawing Sheets

(51) Int. Cl.

| | |
|---|---|
| ***B05C 5/02*** | (2006.01) |
| ***B67D 7/62*** | (2010.01) |
| ***B67D 7/72*** | (2010.01) |
| ***B67D 7/78*** | (2010.01) |
| ***B05C 11/10*** | (2006.01) |
| *B05B 1/32* | (2006.01) |
| *B05C 5/00* | (2006.01) |

(52) U.S. Cl.
CPC . *B67D 7/72* (2013.01); *B67D 7/78* (2013.01); *B05B 1/32* (2013.01); *B05C 5/00* (2013.01)

(58) Field of Classification Search
USPC ....... 222/318, 504, 505, 518, 519, 380, 381, 222/559
See application file for complete search history.

(56) References Cited

U.S. PATENT DOCUMENTS

| | | | | |
|---|---|---|---|---|
| 2005/0224513 | A1* | 10/2005 | Strong | B05B 1/306 222/1 |
| 2008/0011781 | A1 | 1/2008 | Yajima | |
| 2009/0104343 | A1* | 4/2009 | Espenschied | B05B 12/085 427/9 |

FOREIGN PATENT DOCUMENTS

| | | | | | |
|---|---|---|---|---|---|
| JP | S52-50340 | A | | 4/1977 | |
| JP | S5727167 | A | | 2/1982 | |
| JP | S605251 | A | | 1/1985 | |
| JP | 10-28906 | A | * | 2/1998 | B05C 11/10 |
| JP | H1028906 | A | | 2/1998 | |
| JP | 2003-300000 | A | | 10/2003 | |
| JP | 2004-181286 | A | | 7/2004 | |
| JP | 2008-018310 | A | | 1/2008 | |
| JP | 4123897 | B2 | | 7/2008 | |
| JP | 2009-119352 | A | | 6/2009 | |
| JP | 4377153 | B2 | | 12/2009 | |
| JP | 2011161315 | A | | 8/2011 | |

OTHER PUBLICATIONS

Supplementary European Search Report dated Oct. 29, 2015, issued in counterpart EP Patent Application No. 13 76 0452 (1 page).

Notification of Reason for Refusal dated Aug. 10, 2016, issued in counterpart Japanese Patent Application No. 2012-059488, with English translation. (5 pages).

* cited by examiner (a)

(b)

LIQUID MATERIAL DISCHARGE MECHANISM AND LIQUID MATERIAL DISCHARGE DEVICE

TECHNICAL FIELD

The present invention relates to a discharge mechanism and a liquid material discharge device each having a structure to hold a liquid, which is mixed with solid particles, in a uniformly mixed state.

BACKGROUND ART

As an apparatus for dispensing various types of liquid materials in units of a predetermined amount, the so-called "dispenser" is known which includes a container storing the liquid material, and which discharges the liquid material in units of the predetermined amount from a nozzle connected to the container by the action of pneumatic pressure or mechanical pressure.

When trying to discharge, among various types of liquid materials to be discharged by the dispenser, particularly a liquid mixed with solid particles having greater specific gravity than the liquid, there occurs a phenomenon that, with the lapse of time, the solid particles precipitate on the bottom of a container, or aggregate in the vicinity of a nozzle opening. To prevent such a phenomenon, the liquid has to be stirred to keep a state where the solid particles are uniformly mixed in the liquid.

The stirring is generally practiced by disposing a stirrer in association with the container. However, when a discharge mechanism including a nozzle cannot be disposed in union with or near the container and the discharge mechanism is spaced from the container, the solid particles may precipitate midway a pipe connecting the container and the discharge mechanism, and a sufficient effect cannot be obtained with the stirring inside the container in many cases. As another stirring method used to cope with the above-mentioned problem, there is a method of forming a circulation path between the container and the discharge mechanism, and keeping the liquid in a state always flowing in the circulation path.

For example, Patent Document 1 discloses a circulation-type liquid material discharge device including a container that stores a liquid material, a means that stirs the liquid material in the container, and a looped piping through which the liquid material in the container is always circulated, a pump that is disposed in the looped piping and that feeds the liquid material under pressure, a nozzle that has a discharge opening, and a valve that opens and closes communication between the looped piping and the nozzle, wherein the valve includes a substantially linear flow path that constitutes a part of the looped piping and that extends substantially horizontally, a valve seat that is formed in an inner wall surface of the flow path at the lower side thereof, the valve seat being formed such that the vicinity of the valve seat is not positioned at a level lower than the inner wall surface of the flow path around the valve seat and that the valve seat is positioned at a level higher than the lowest end of the inner wall surface of the flow path, and a lift valve formed such that a tip of the lift valve is movable to cross the flow path and come into contact with the valve seat, thus opening and closing communication between the flow path and the nozzle.

Patent Document 2 discloses an ink jet nozzle including a nozzle hole through which ink is discharged, an ink chamber from which the ink under pressure is supplied to the nozzle hole, a needle valve that is disposed in the ink chamber and that opens and closes the nozzle hole, a driving mechanism that drives the needle valve, a driving-mechanism accommodating space that accommodates the driving mechanism, and an elastic diaphragm that isolates the ink chamber and the driving-mechanism accommodating space from each other, the driving-mechanism accommodating space containing gas or a liquid that is subjected to pressure comparable to the pressure applied to the ink in the ink chamber, wherein an ink tank under pressure is connected to the ink chamber through a circulation path, and the ink is circulated by employing a pump.

LIST OF PRIOR-ART DOCUMENTS

Patent Documents

Patent Document 1: Japanese Patent No. 4377153
Patent Document 2: Japanese Patent No. 4123897

SUMMARY OF THE INVENTION

Problems to be Solved by the Invention

The device disclosed in Patent Document 2 has the problem as follows. Because a bottom surface of the ink chamber is located at a position lower than ink inlet/outlet paths, an ink component (solid particles) tend to precipitate and accumulate. If the precipitated and accumulated solid particles reach the nozzle hole, there may occur clogging of the nozzle hole, unevenness of concentration, and damages of the needle valve and the nozzle hole.

On the other hand, in the device disclosed in Patent Document 1, because the valve seat is positioned at a level higher than the lowest end of the flow path, a certain effect is obtained in preventing precipitation and accumulation of the solid particles onto a region including the valve seat. However, the solid particles precipitate and accumulate onto a region located at a position lower than the valve seat. Thus, there is a possibility that peeling-off or rising-up of the precipitated and accumulated solid particles may occur, and the solid particles may reach the region including the valve seat. The solid particles are precipitated and accumulated more significantly when the region including the valve seat is formed in shape rising at a steeper slope.

In a configuration of circulating a liquid by connecting a substantially horizontal inflow pipe and outflow pipe to a liquid chamber (space) that is communicated with a nozzle, fixtures (e.g., nuts) for connecting the inflow pipe and the outflow pipe may interfere with the discharge operation. Stated in another way, when the distance between a discharge opening and the liquid chamber is short, the fixtures (e.g., nuts) are positioned at a level lower than or comparable to the discharge opening. This may cause the problem the fixtures strike against, for example, elements mounted on a substrate.

Accordingly, an object of the present invention is to provide a liquid material discharge mechanism and a liquid material discharge device, which can solve the problems described above.

Means for Solving the Problems

According to a first invention, there is provided a discharge mechanism comprising a drive unit that moves a rod reciprocally, and a discharge unit including a liquid chamber allowing the rod to pass therein and a valve seat communicated with a nozzle, the nozzle discharging therefrom a liquid mixed with solid particles with an operation of moving the valve seat and a tip of the rod relatively away from each other, wherein the discharge unit includes an inflow path through which the liquid mixed with the solid particles flows into the liquid chamber, and an outflow path through which the liquid mixed with the solid particles in the liquid chamber flows out, and the inflow path and the outflow path are connected in a V-shape, the liquid chamber being disposed in a valley portion of the V-shape, and the valve seat being disposed at a lower end of the V-shape.

According to a second invention, in the first invention, an angle formed by a center axis of the liquid chamber and a center axis of the inflow path is equal to an angle formed by the center axis of the liquid chamber and a center axis of the outflow path.

According to a third invention, in the first invention, an angle formed by a center axis of the liquid chamber and a center axis of the outflow path is greater than an angle formed by the center axis of the liquid chamber and a center axis of the inflow path.

According to a fourth invention, in the third invention, the outflow path and the valve seat are connected substantially without a level difference.

According to a fifth invention, in the first invention, an angle formed by a center axis of the liquid chamber and a center axis of the outflow path is smaller than an angle formed by the center axis of the liquid chamber and a center axis of the inflow path.

According to a sixth invention, in the fifth invention, the inflow path and the valve seat are connected substantially without a level difference.

According to a seventh invention, in any one of the first to sixth inventions, a center axis of the inflow path and a center axis of the outflow path are connected linearly.

According to an eighth invention, in any one of the first to sixth inventions, a center axis of the inflow path and a center axis of the outflow path are connected at an angle formed therebetween.

According to a ninth invention, there is provided a liquid material discharge device comprising the discharge mechanism according to any one of the first to eighth inventions, a container that stores a liquid mixed with solid particles, a pump that feeds the liquid mixed with the solid particles under pressure, and liquid pipes through which the discharge mechanism, the container, and the pump are connected to form a circulation path.

According to a tenth invention, in the ninth invention, an inflow path of the discharge mechanism and the pump are connected through a plurality of regulators, and an outflow path of the discharge mechanism and the container are connected through a regulator.

Advantageous Effects of the Invention

With the present invention, the discharge mechanism and the discharge device can be obtained which are able to solve the problem of precipitation and accumulation of the solid particles in the circulation path within the discharge unit.

The present invention is further able to solve the problem that the fixtures (e.g., nuts) for connecting the inflow pipe and the outflow pipe interfere with the discharge operation.

MODE FOR CARRYING OUT THE INVENTION

The mode for carrying out the present invention will be described below.

It is to be noted that the term "liquid material" used in the following description implies a liquid material in a state mixed with solid particles unless otherwise specified.

[Circulation Mechanism]

Figure 1:
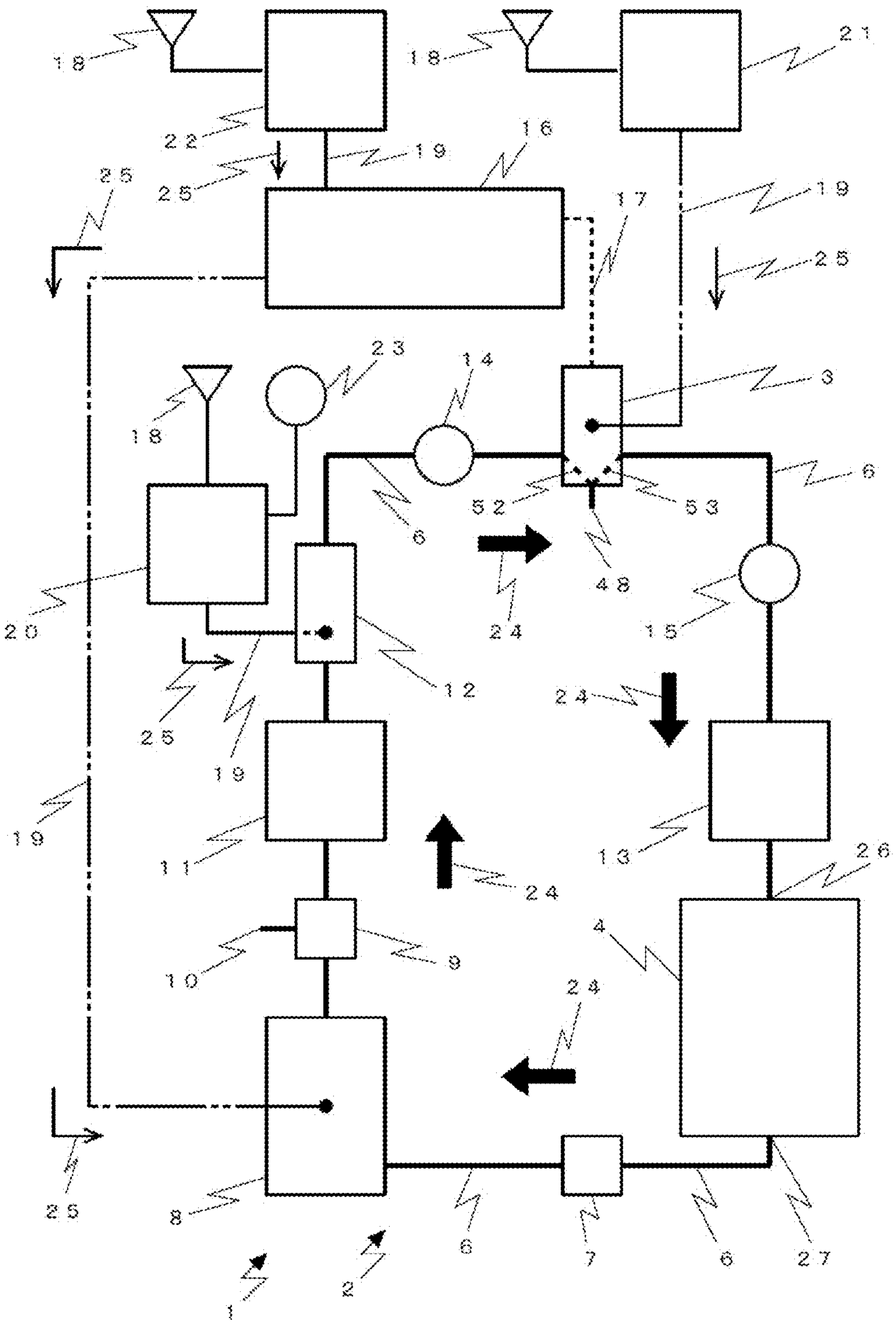
FIG. 1 is a block diagram to explain a discharge device equipped with a circulation mechanism according to an embodiment.

FIG. 1 is a block diagram to explain a discharge device equipped with a circulation mechanism according to an embodiment.

A discharge device 1 equipped with a circulation mechanism 2 according to the embodiment mainly includes a container 4 that stores a liquid material 5, a discharge mechanism 3 that discharges the liquid material 5 in units of a constant amount, and a pump 8 that feeds the liquid material 5 under pressure. Those components are connected by liquid pipes 6 to form a circulation path through which the liquid material 5 can be circulated.

The container 4 has an inlet port 26 and an outlet port 27 separately, thus allowing the container 4 to be assembled in the circulation path. A two-way valve 7 is connected downstream of the outlet port 27 to change over communication and cutoff of the circulation path. The container 4 may include a stirrer for stirring the liquid material 5.

The discharge mechanism 3 according to this embodiment is of the needle valve type in which the liquid material 5 is discharged by driving a valve element 30 in a manner of opening and closing a communication hole 46 of a nozzle 48. Working gas to drive the valve element 30 is supplied to the discharge mechanism 3 from a compressed gas source 18 after pressure of the working gas is regulated by a fifth regulator 21. The discharge mechanism 3 is connected to a controller 16 through a control line 17 for control of operation of the discharge mechanism 3. To circulate the liquid material 5, the discharge mechanism 3 includes an inflow path 52 and an outflow path 53 separately, thus forming therein flow paths in communication with the nozzle 48. More details of the discharge mechanism 3 will be described later.

The pump 8 used in this embodiment is a diaphragm pump. The diaphragm pump is operated by supplying working gas to it. Pressure of the liquid material 5, which is fed under pressure, can be adjusted by regulating the pressure of the working gas. Thus, the working gas is supplied through the controller 16 that is able to freely control supply and stop of the working gas and pressure regulation. The compressed gas source 18 serving as a working gas source is connected to the controller through a sixth regulator 22. While this embodiment employs the diaphragm pump, the pump type is not limited to particular one. For example, another type (displacement) pump, such as a screw pump, a gear pump, or a plunger pump, can also be used.

Two regulators (11, 12) are disposed between the pump 8 and the discharge mechanism 3. Of those two regulators, the first regulator 11 is an ordinary pressure reducing valve that regulates pressure by adjusting an opening degree of the valve. The second regulator 12 is a regulator that regulates pressure by causing working gas to act from the outside on a diaphragm positioned to face an inner flow path, and by adjusting an opening degree of the inner flow path. To that end, the compressed gas source 18 serving as the working gas source is connected to the second regulator 12 through a fourth regulator 20. Thus, the pressure at the second regulator 12 can be regulated by regulating the pressure of the fourth regulator 20. Furthermore, the pressure of the liquid material 5 flowing into the discharge mechanism 3 (so-called discharge pressure) is regulated by adjusting the second regulator 12. The pressure of the liquid material 5 after the regulation is confirmed by employing a first pressure gauge 14 that is disposed between the second regulator 12 and the discharge mechanism 3. Because the second regulator 12 includes the diaphragm, it is possible to suppress pulsation of liquid pressure attributable to the pump 8 with flexibility of the diaphragm, and to stabilize the liquid pressure. In addition, because the first regulator 11 is disposed upstream of the second regulator 12, the liquid material 5 can be introduced to the second regulator 12 after the pulsation of the liquid pressure attributable to the pump 8 has been suppressed (by the inherent action of the pressure reducing valve). Hence the liquid pressure can be further stabilized. The stabilization of the liquid pressure contributes to stabilizing discharge in units of a constant amount, realizing stable circulation, and keeping a state of solid particles being uniformly mixed in a liquid.

A three-way valve 9 is disposed between the above-mentioned two regulators (11, 12) and the pump 8, and one of three ports of the three-way valve 9 is a port 10 communicating with the outside. The port 10 communicating with the outside is used as a drain port through which the liquid material in the liquid pipes 6 are drained to empty the liquid pipes 6 when the operation has ended, or when the type of the liquid material is replaced with different one. The port 10 may also be used as a bubble purging port when the liquid material 5 is filled into the liquid pipes 6 in an empty state. Usually, the port 10 communicating with the outside is closed.

A third regulator 13 is disposed between the discharge mechanism 3 and the container 4. The third regulator 13 is an ordinary pressure reducing valve that regulates pressure by adjusting an opening degree of the valve. The third regulator 13 has the function of stabilizing pressure of the liquid material 5 in the liquid pipe 6 that is positioned at the side closer to the discharge mechanism 3 than the third regulator 13 (i.e., the side upstream of the third regulator 13). More specifically, the third regulator 13 functions to stem a flow of the liquid material 5 and to retard the flow, thereby suppressing fluctuation of the liquid pressure, which is caused by the pump 8 and the discharge mechanism 3. The pressure of the liquid material 5 through the regulation by the third regulator 13 is confirmed by employing a second pressure gauge 15 that is disposed between the third regulator 13 and the discharge mechanism 3. As with the above-mentioned two regulators (11, 12), the third regulator 13 stabilizes the liquid pressure, thus contributing to stabilizing discharge in units of a constant amount, realizing stable circulation, and keeping the state of the solid particles being uniformly mixed in the liquid.

[Discharge Mechanism]

Figure 2:
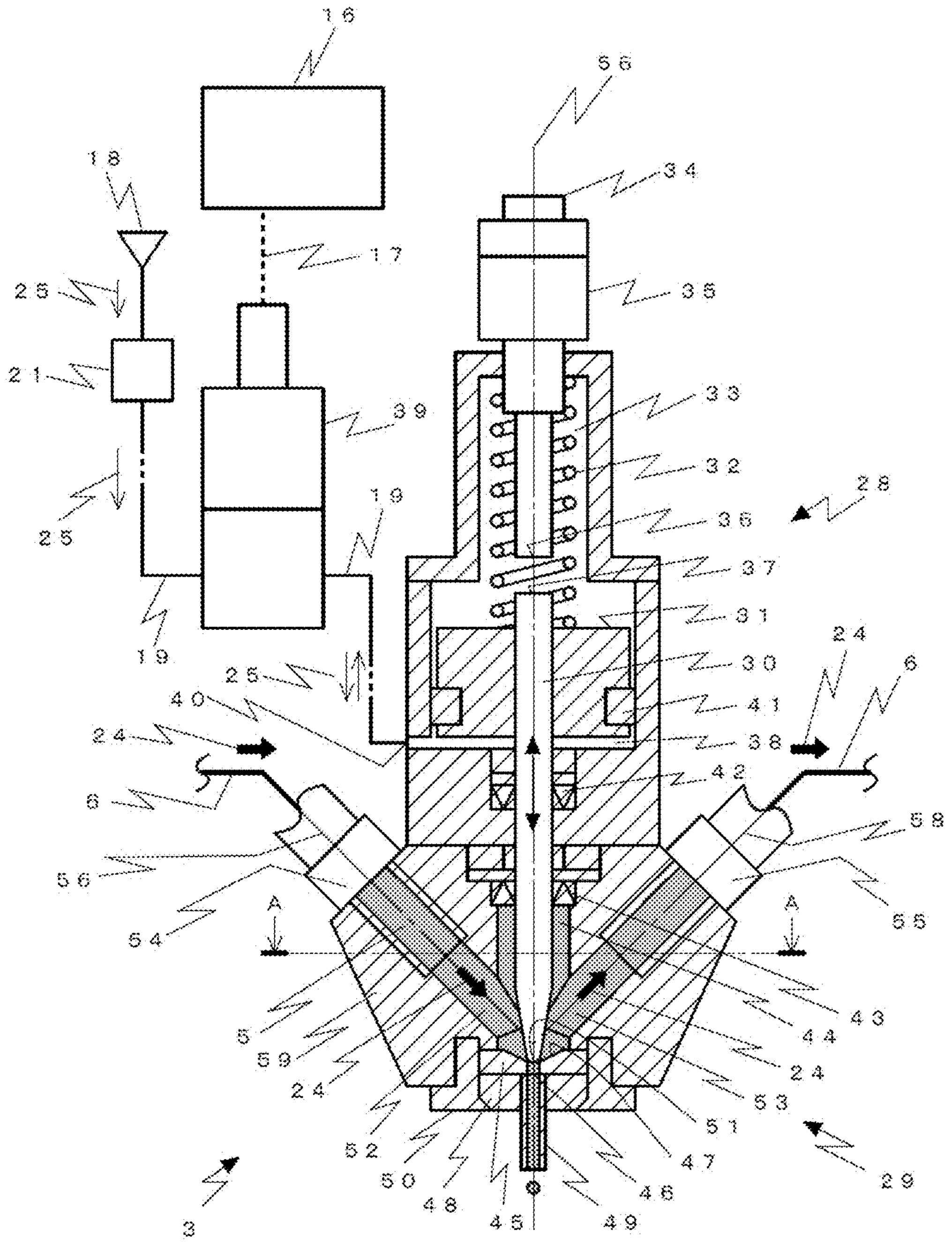
FIG. 2 is a sectional view to explain a discharge mechanism used in the embodiment.

The discharge mechanism 3 according to this embodiment will be described in more detail below. FIG. 2 is a sectional view of the discharge mechanism 3 used in this embodiment. In the following description, the side including a stroke adjustment screw 34 is called the "upper side", and the side including the nozzle 48 is called the "lower side" in some cases.

The discharge mechanism 3 according to this embodiment is of the needle valve type in which the liquid material 5 is discharged by driving the valve element 30 to open and close the communication hole 46 of the nozzle 48. The discharge mechanism 3 is mainly constituted by a drive unit 28 that drives the valve element 30 up and down, and a discharge unit 29 through which the liquid material 5 is discharged by the action of the driven valve element 30.

In the drive unit 28, a piston 31 fixedly attached to a rod 30, which serves as the valve element, is slidable up and down within the drive unit 28. A spring chamber 33 for accommodating a spring 32, which biases the rod 30 to move downwards, is formed at the upper side of the piston 31, and an air chamber 38, into which compressed air flows to move the rod 30 upwards, is formed at the lower side of the piston 31. A compression spring is used as the spring 32. In an upper portion of the spring chamber 33, a stroke adjustment screw 34 is disposed which restricts movement of the rod 30 and adjusts a stroke of the rod, i.e., a distance through which the rod is moved. The stroke of the rod 30 is adjusted by turning a thumb 35 of the adjustment screw 34, which is exposed to the outside, and by moving a tip 36 of the adjustment screw 34 up and down to change a distance through which an upper end 37 of the rod is movable until striking against the tip 36 of the adjustment screw 34. The compressed air flowing into the air chamber 38 at the lower side of the piston 31 is supplied from the compressed gas source 18 so as to flow into the air chamber 38 through an air inlet port 40 of the drive unit 28 through a selector valve 39. The fifth regulator 21 for regulating pressure is disposed between the compressed gas source 18 and the selector valve 39. A solenoid valve or a rapid response valve is used as the selector valve 39, and on/off control of the selector valve 39 is performed by the controller 16. Sealing members (41, 42) are disposed respectively in a lateral surface of the piston 31 and a portion under the air chamber 38, through which portion the rod 30 penetrates, to prevent leakage of the compressed air having flowed into the air chamber 38.

The discharge unit 29 includes a discharge block 59 having a liquid chamber 44 in which the rod 30 is movable up and down, the inflow path 52, and the outflow path 53. A hole through which the rod 30 penetrates is formed in an upper portion of the discharge block 59, and a third sealing member 43 is disposed in the upper portion of the discharge block 59 to prevent leakage of the liquid material 5 in the liquid chamber 44. A valve sheet 45 serving as a valve seat and the nozzle 48, through which the liquid material 5 is discharged, are mounted in a lower portion of the discharge block 59. The communication hole 46 that communicates the liquid chamber 44 and the nozzle 48 with each other is formed in the valve sheet 45 to penetrate through a center of the valve sheet 45. An upper surface of the valve sheet 45 is formed as a conical surface 47. A tip 51 of the rod comes into contact with a bottom portion of the conical surface 47 or moves away from the conical surface 47 to close or open the communication hole 46, whereby the liquid material 5 is discharged through the nozzle 48. The conical surface 47 preferably has a larger area than a contact area of the rod tip 51. Such a relation is effective in relieving the problem of precipitation and accumulation of the solid particles.

A tubular member 49 communicating with the communication hole 46 of the valve sheet 45 penetrates through the nozzle 48 such that the liquid material 5 having flowed through the communication hole 46 of the valve sheet 45 is discharged to the outside after passing through the tubular member 49. The valve sheet 45 and the nozzle 48 are fixed to a lower end of the liquid chamber 44 with the aid of a cap-like member 50 in a detachable manner for easy replacement.

The inflow path 52 and the outflow path 53 are flow paths allowing the liquid material 5 to circulate, and are communicated with the liquid chamber 44 and the liquid pipes 6. In the following, the inflow path 52 and the outflow path 53 are called together a discharge-unit circulation path in some cases. The inflow path 52 is communicated at its one end with the liquid chamber 44 at a lateral surface thereof in a position close to the valve sheet 45, and is formed to extend upwards from the one end such that a center axis 56 of the liquid chamber and a center axis 57 of the inflow path defines an acute angle. The other end of the inflow path 52 is connected to the liquid pipe 6 through an inflow pipe 54. On the other hand, the outflow path 53 is communicated at its one end with the liquid chamber 44 at a lateral surface thereof in a position close to the valve sheet 45, which lateral surface is opposed to the lateral surface where the inflow path 52 is communicated with the liquid chamber 44, and is formed to extend upwards from the one end such that the center axis 56 of the liquid chamber and a center axis 58 of the outflow path defines an acute angle. The other end of the outflow path 53 is connected to the liquid pipe 6 through an inflow pipe 55. Stated in another way, the inflow path 52 and the outflow path 53 form a V-shape having a crossed point positioned near the valve sheet 45, and they are communicated with the liquid chamber 44 in a valley portion of the V-shape. In this embodiment, the inflow path 52 and the outflow path 53 are formed such that the angle formed by the center axis 56 of the liquid chamber and the center axis 57 of the inflow path is equal to the angle formed by the center axis 56 of the liquid chamber and the center axis 58 of the outflow path. Moreover, when viewed from above, the inflow path 52 and the outflow path 53 are formed to lie on one linear line and to extend in the same direction (see FIG. 4(*a*)). Because the discharge-unit circulation path (i.e., the inflow path 52 and the outflow path 53) is formed to extend upwards at an acute angle relative to the center axis 56 of the liquid chamber, there is no risk that fixtures (e.g., nuts) for connecting the discharge block 59 and the liquid pipes 6 may strike against a workpiece. Thus, because an inlet opening of the inflow path 52 and an outlet opening of the outflow path 53 are located at positions sufficiently higher than the nozzle 48, a discharge mechanism having a short nozzle can also be employed.

In the inflow path 52 and the outflow path 53, the liquid material 5 flows as follows. First, the liquid material 5 having passed through the liquid pipe 6 at the inflow side flows into the inflow path 52 from the inflow pipe 54. Then, the liquid material 5 flows down toward the valve sheet 45 through the inflow path 52. Upon reaching the valve sheet 45, the liquid material 5 changes its flowing direction from down to up, and then flows into the outflow path 53. Thereafter, the liquid material 5 flows upwards through the outflow path 53 away from the valve sheet 45, and then flows into the liquid pipe 6 at the outflow side through the outflow pipe 55. By thus causing the liquid material 5 to flow toward the valve sheet 45 at an angle, the flow of the liquid material 5 acts to raise and carry away the liquid material 5 near the valve sheet 45, and to prevent the solid particles from precipitating and accumulating on the valve sheet 45 and in the communication hole 46. As a result, the solid particles can be kept in the state uniformly mixed in the liquid material.

The controller 16 for controlling, e.g., the on/off operation of the selector valve 39, and supply/stop of the working gas supplied to the pump 8 (see FIG. 1), is connected to the above-described discharge mechanism 3 according to this embodiment.

The above-described discharge mechanism 3 basically operates as follows. Here, the state where the rod 30 is contacted with the valve sheet 45 and the communication hole 46 is closed (i.e., the state illustrated in FIG. 2) is assumed to be an initial state.

First, when an operation start signal is sent to the selector valve 39 (i.e., the selector valve 39 is switched on), the selector valve 39 is switched over to allow the compressed air to flow into the air chamber 38. The compressed air acts to lift up the piston 31 while compressing the spring 32, whereby the rod 30 is moved upwards to open the communication hole 46. Correspondingly, the liquid material 5 is discharged from a tip of the nozzle 48 after passing through the tubular member 49. When the operation signal to the selector valve 39 is cut off (i.e., the selector valve 39 is switched off) after the lapse of a setting time, the selector valve 39 is changed over to start release of the compressed air in the air chamber 38 to the outside. Therefore, the piston 31 is moved downwards by a resilient force of the spring 32, thus causing the rod 30 to close the communication hole 46. Responsively, the liquid material 5 discharged from the tip of the nozzle 48 is departed from the nozzle 48 and is ejected toward an object. The foregoing is a series of operations to execute one shot of discharge in the discharge mechanism 3 according to this embodiment.

In the above-described discharge mechanism 3, the liquid material can be discharged continuously in a linear form, or can be discharged to fly from the nozzle 48 in the form of a droplet by changing the above-mentioned liquid pressure (i.e., the working pressure of the diaphragm pump 8), the stroke, a time during which the communication hole 46 is kept open, etc.

In this embodiment, the discharge mechanism 3 is constituted by employing a needle valve. However, the valve type is not limited to particular one, and the present invention can be applied to other types of valves as well. Other types of valves include, for example, a poppet valve, a slide valve, and a rotary valve.

[Operation Flow]

Figure 3:
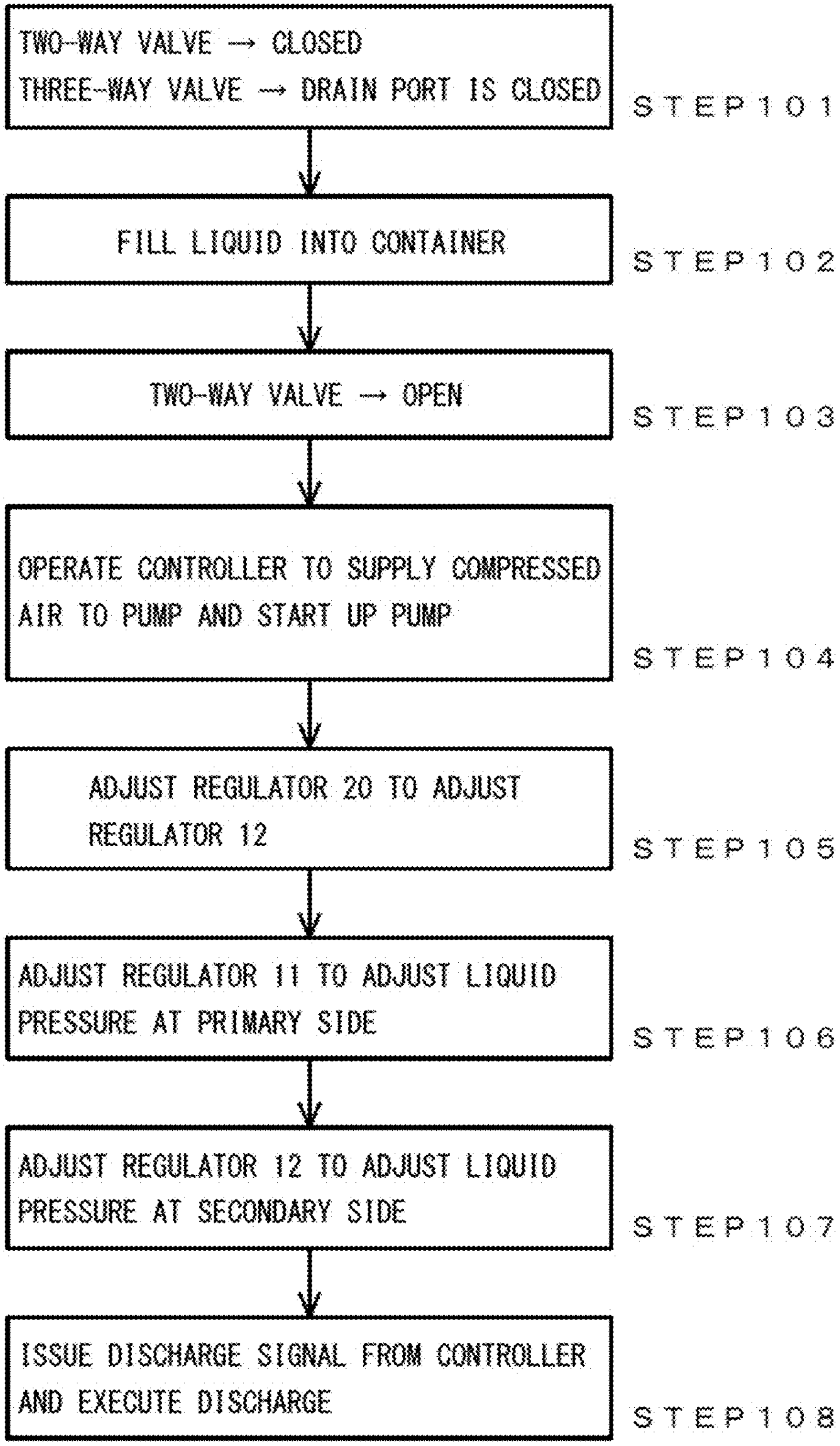
FIG. 3 is a flowchart to explain the operation of the discharge device equipped with the circulation mechanism according to the embodiment.

The operation of the discharge device 1 equipped with the circulation mechanism 2, according to this embodiment, will be described below in accordance with a flowchart of FIG. 3 by referring to FIG. 1.

First, the two-way valve 7 is changed over into a closed state, and the three-way valve 9 is changed over to a direction in which the drain port 10 is closed (STEP 101).

The liquid material 5 mixed with the solid particles is filled into the container 4 (STEP 102). Thereafter, the two-way valve 7 is changed over into a communicated state (STEP 103), and the controller 16 is operated to supply the compressed gas to the pump 8, thus starting up the pump 8 (STEP 104). With the operation of the pump 8, the liquid material 5 starts to circulate through the liquid pipes 6 in a direction denoted by a reference symbol 24. Then, the fourth regulator 20 is adjusted to adjust the second regulator 12 (STEP 105). At that time, it is preferable that a third pressure gauge 23 is disposed in association with the fourth regulator 20 and the adjustment is performed while checking the reading of the third pressure gauge 23. Furthermore, it is preferable to previously determine the relation between the magnitude of pressure at the fourth regulator 20 and the magnitude of liquid pressure delivered from the pump 8, and to utilize the determined relation as a guide for the above-mentioned adjustment. Then, the first regulator 11 is adjusted to regulate the liquid pressure at the primary side to the target pressure (STEP 106). Moreover, the second regulator 12 is adjusted to regulate the liquid pressure at the secondary side to the target pressure (STEP 107). In general, stable discharge and circulation of the liquid material can be realized by regulating the pressure at the primary side (i.e., the upstream side; first pressure gauge 14) of the discharge mechanism 3 and the pressure at the secondary side (i.e., the downstream side; second pressure gauge 15) of the discharge mechanism 3 to be kept same. However, when the liquid material 5 has high viscosity, the pressure at the primary side is preferably regulated to be higher than at the secondary side because a pressure loss is large. Through experiments, when the viscosity is 1 [cps], satisfactory circulation is obtained on condition that the setting pressure is 20 [kPa] at both the primary and secondary sides. When the viscosity is 100 [cps], satisfactory circulation is obtained on condition that the setting pressure is 170 [kPa] at the primary side and 60 [kPa] at the secondary side. Upon the end of the pressure regulation for all the pressure gauges, preparations before starting the discharge are completed. Then, a discharge signal is issued from the controller 16 to execute the discharge (STEP 108). Once the circulation of the liquid material has started, it is preferable to keep the circulation until the end of the operation.

[Modifications of Discharge-Unit Circulation Path]

Modifications of the discharge-unit circulation path (i.e., the inflow path 52 and the outflow path 53) formed in the discharge unit 29 of the discharge mechanism 3 will be described below.

Figure 4:
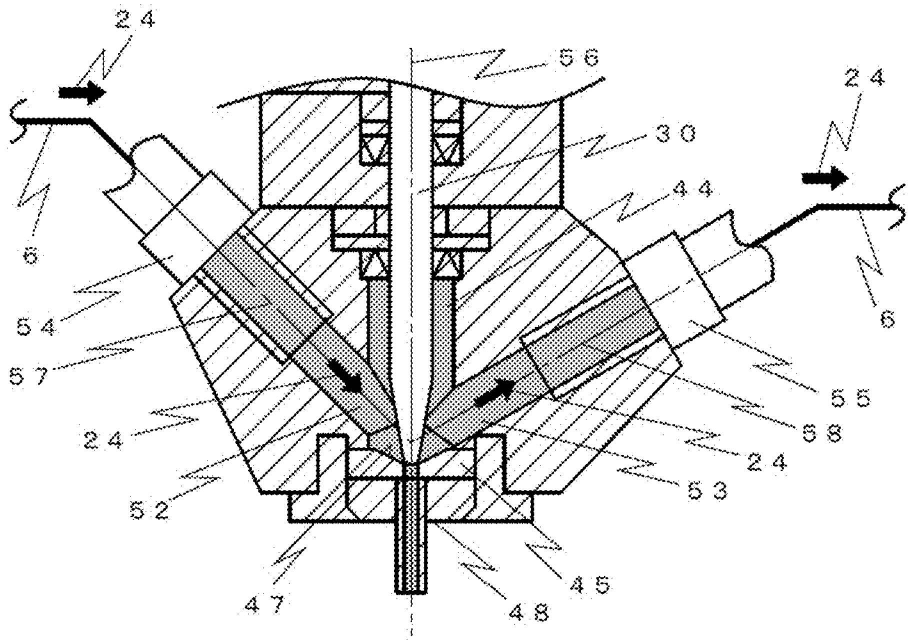
FIG. 4 is a sectional view to explain a first modification of a circulation path in a discharge unit. Specifically, FIG. 4(*a*) represents the case where an angle formed by a center axis of a liquid chamber and a center axis of an outflow path is greater than an angle formed by the center axis of the liquid chamber and a center axis of an inflow path, and FIG. 4(*b*) represents the case where the angle formed by the center axis of the liquid chamber and the center axis of the outflow path is smaller than the angle formed by the center axis of the liquid chamber and the center axis of the inflow path.
Figure 4:
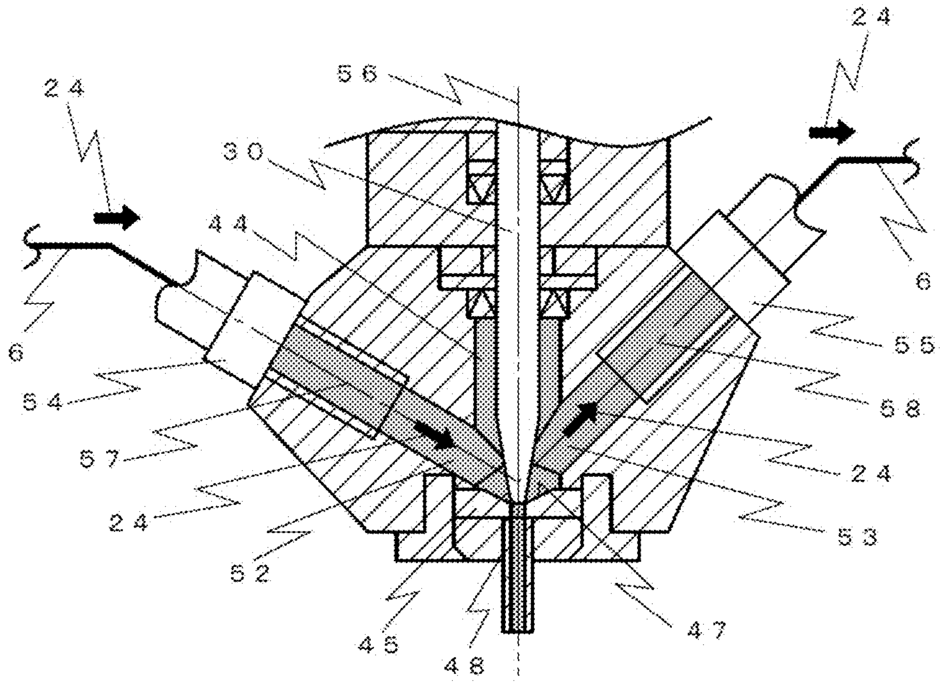

(1) Modifications Having Different Angles Relative to Center Axis of Liquid Chamber Modifications in which the angle formed by the center axis 56 of the liquid chamber and the center axis 57 of the inflow path is set different from the angle formed by the center axis 56 of the liquid chamber and the center axis 58 of the outflow path will be described below with reference to FIG. 4. FIG. 4(*a*) represents the case where the angle formed by the center axis 56 of the liquid chamber and the center axis 58 of the outflow path is greater than the angle formed by the center axis 56 of the liquid chamber and the center axis 57 of the inflow path, and FIG. 4(*b*) represents the case where the angle formed by the center axis 56 of the liquid chamber and the center axis 58 of the outflow path is smaller than the angle formed by the center axis 56 of the liquid chamber and the center axis 57 of the inflow path.

In FIG. 4(*a*), the discharge-unit circulation path is formed such that the angle formed by the center axis 56 of the liquid chamber and the center axis 58 of the outflow path is greater than the angle formed by the center axis 56 of the liquid chamber and the center axis 57 of the inflow path. Because the angle at the side including the inflow path 52 is smaller and the liquid material 5 flows toward the valve sheet 45 in a state inclined nearly perpendicularly to the valve sheet 45, the flowing-in liquid material 5 acts to raise the liquid material 5 in the vicinity of the valve sheet 45, thereby preventing precipitation and accumulation of the solid particles there. Because the angle at the side including the outflow path 53 is greater and the outflow path 53 is in a state closer to a horizontal posture than the inflow path 52, the liquid material 5 is more apt to flow out and smoother circulation of the liquid material can be realized. Here, the conical surface 47 is preferably constituted by a slope inclined at the same angle as an angle formed by a lower surface of the outflow path 53 and a horizontal plane such that the conical surface 47 and the outflow path 53 are connected to each other substantially without a level difference.

In FIG. 4(*b*), the discharge-unit circulation path is formed such that the angle formed by the center axis 56 of the liquid chamber and the center axis 58 of the outflow path is smaller than the angle formed by the center axis 56 of the liquid chamber and the center axis 57 of the inflow path. Because the angle at the side including the inflow path 52 is greater and the liquid material 5 flows along the upper surface (conical surface 47) of the valve sheet 45, the flowing-in liquid material 5 acts to carry away the liquid material 5 in the vicinity of the valve sheet 45, thereby preventing precipitation and accumulation of the solid particles there. Because the angle at the side including the outflow path 53 is smaller and the outflow path 53 is in a state closer to a vertical posture than the inflow path 52, the liquid material 5 is more quickly carried out upwards to prevent the solid particles from remaining in the liquid chamber 44 for a longer time. Here, the conical surface 47 is preferably constituted by a slope inclined at the same angle as an angle formed by a lower surface of the inflow path 52 and a horizontal plane such that the inflow path 52 and the conical surface 47 are connected to each other substantially without a level difference.

(2) Modifications Having Different Orientations When Viewed from Above

Figure 5:
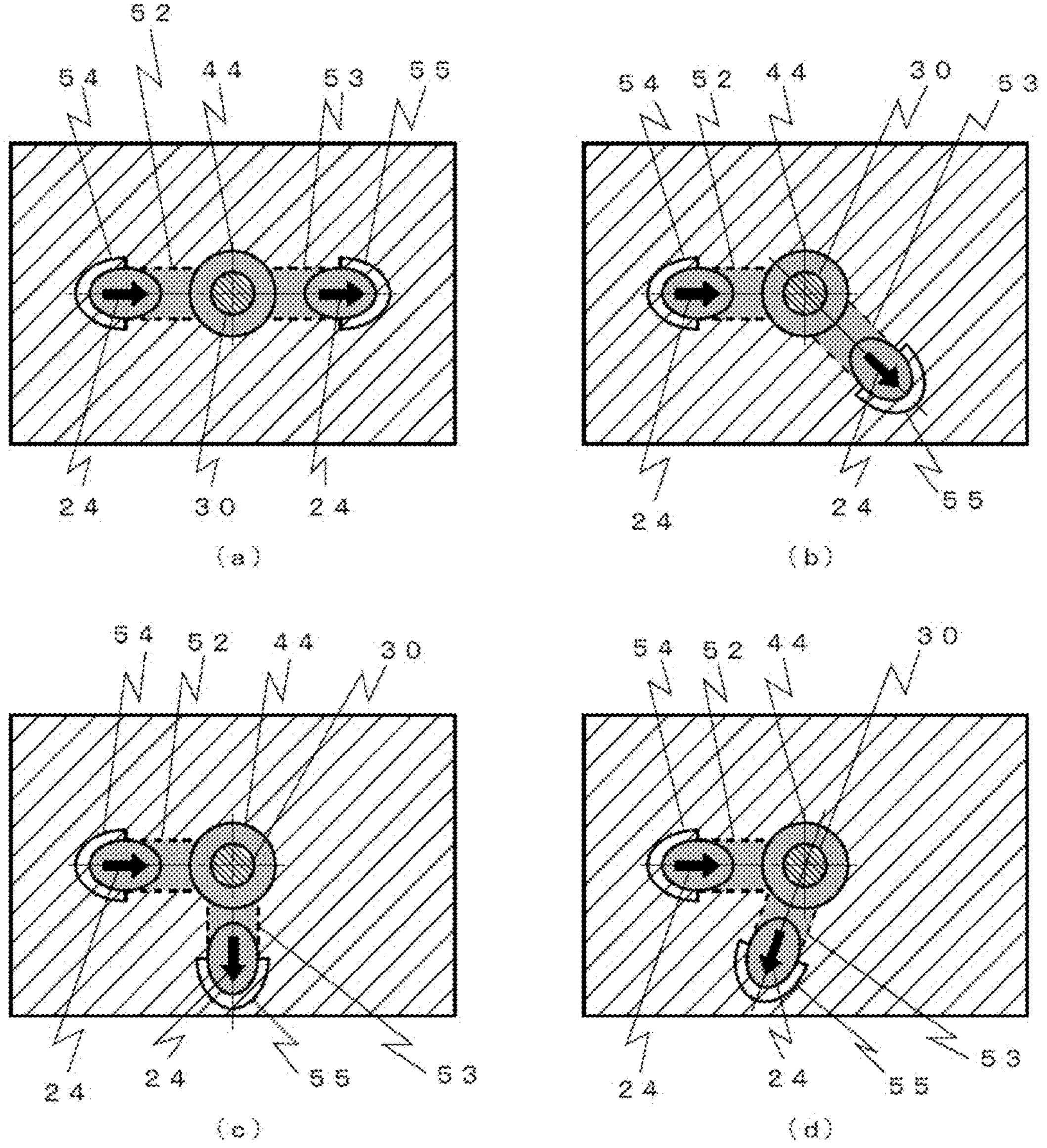
FIG. 5 is a sectional view to explain a second modification of the circulation path in the discharge unit. Specifically, FIG. 5(*a*) represents the case where an angle formed by the inflow path and the outflow path is 180 degrees, FIG. 5(*b*) represents the case where the angle formed by the inflow path and the outflow path is an obtuse angle, FIG. 5(*c*) represents the case where the angle formed by the inflow path and the outflow path is a right angle, and FIG. 5(*d*) represents the case where the angle formed by the inflow path and the outflow path is an acute angle.

Modifications in which the inflow path 52 and the outflow path 53 have different orientations when viewed from above will be described below with reference to FIG. 5. FIG. 5 illustrates a section taken along A-A in FIG. 2. In FIG. 5(*a*), the center axis 57 of the inflow path and the center axis 58 of the outflow path are connected linearly. In FIGS. 5(*b*) to 5(*d*), the center axis 57 of the inflow path and the center axis 58 of the outflow path are connected at an angle formed therebetween. In more detail, when viewed from above, FIG. 5(*a*) represents the case where an angle formed by the inflow path 52 and the outflow path 53 is 180 degrees (corresponding to FIG. 2), FIG. 5(*b*) represents the case where the angle formed by the inflow path 52 and the outflow path 53 is an obtuse angle, FIG. 5(*c*) represents the case where the angle formed by the inflow path 52 and the outflow path 53 is a right angle, and FIG. 5(*d*) represents the case where the angle formed by the inflow path 52 and the outflow path 53 is an acute angle.

When the orientations of the inflow path 52 and the outflow path 53 are set different from each other to provide an angle between both the paths as illustrated in FIGS. 5(*b*) to 5(*d*), the liquid material 5 is caused to flow in the liquid chamber 44 while circulating around the rod 30. Accordingly, the stirring action can be increased in comparison with the case where the liquid material 5 flows linearly through the inflow path 52 and the outflow path 53 in the same direction (FIG. 5(*a*)).

While, in FIGS. 5(*b*) to 5(*d*), the angle is formed at the lower side on the drawing sheet (i.e., at the front side of the discharge mechanism 3), the angle may be formed in a direction opposite to that in the illustrated case (i.e., at the upper side on the drawing sheet, the rear side of the discharge mechanism 3). However, the angle is preferably formed at the front side of the discharge mechanism 3 as in FIG. 5 for the reason that the discharge mechanism 3 is fixed at the rear side to a not-illustrated stand or XYZ moving mechanism when used.

The modifications having different angles in above (1) and the modifications having different orientations in above (2) may be practiced independently or in combination with each other.

LIST OF REFERENCE SYMBOLS

1: liquid material discharge device 2: circulation mechanism 3: discharge mechanism 4: container 5: liquid mixed with solid particles, liquid material 6: liquid pipe 7: two-way valve 8: pump 9: three-way vale 10: port communicating with outside (drain port) 11: first regulator 12: second regulator 13: third regulator 14: first pressure gauge 15: second pressure gauge 16: controller 17: control line 18: compressed gas source 19: gas pipe 20: fourth regulator 21: fifth regulator 22: sixth regulator 23: third pressure gauge 24: flow of liquid 25: flow of gas 26: inlet port (container) 27: outlet port (container) 28: drive unit 29: discharge unit 30: rod (valve element) 31: piston 32: spring 33: spring chamber 34: stroke adjustment screw 35: thumb 36: tip of adjustment screw 37: upper end of rod 38: air chamber 39: selector valve 40: air inlet port 41: first sealing member 42: second sealing member 43: third sealing member 44: liquid chamber 45: valve sheet (valve seat) 46: communication hole 47: conical surface 48: nozzle 49: tubular member 50: cap-like member 51: tip of rod 52: inflow path 53: outflow path 54: inflow pipe 55: outflow pipe 56: center axis of liquid chamber 57: center axis of inflow path 58: center axis of outflow path 59: discharge block

The invention claimed is:

1. A discharge mechanism for a liquid mixed with solid particles comprising:
- a rod,
- a drive unit that moves a rod reciprocally, and
- a discharge unit comprising
  - a liquid chamber allowing the rod to pass therein and
  - a valve seat communicated with a nozzle, the nozzle discharging therefrom a liquid mixed with solid particles with an operation of moving the valve seat and a tip of the rod relatively away from each other,
  - an inflow path through which the liquid mixed with the solid particles flows into the liquid chamber, and
  - an outflow path through which the liquid mixed with the solid particles in the liquid chamber flows out,
- wherein the liquid is discharged continuously in a linear form, or is discharged to fly from the nozzle in the form of a droplet,
- wherein the inflow path and the outflow path are connected in a V-shape near the valve seat, the liquid chamber being disposed in a valley portion of the V-shape,
- wherein the valve seat is disposed at a lower end of the liquid chamber corresponding to a lower end of the V-shape, the upper surface of the valve seat having a concave of a conical shape, and
- wherein the concave has a larger area than a contact area of the tip of the rod.

2. The discharge mechanism according to claim 1, wherein an angle formed by a center axis of the liquid chamber and a center axis of the inflow path is equal to an angle formed by the center axis of the liquid chamber and a center axis of the outflow path.

3. The discharge mechanism according to claim 1, wherein an angle formed by a center axis of the liquid chamber and a center axis of the outflow path is greater than an angle formed by the center axis of the liquid chamber and a center axis of the inflow path.

4. The discharge mechanism according to claim 3, wherein the outflow path and the valve seat are connected substantially without a level difference.

5. The discharge mechanism according to claim 1, wherein an angle formed by a center axis of the liquid chamber and a center axis of the outflow path is smaller than an angle formed by the center axis of the liquid chamber and a center axis of the inflow path.

6. The discharge mechanism according to claim 5, wherein the inflow path and the valve seat are connected substantially without a level difference.

7. The discharge mechanism according to claim 1, wherein a center axis of the inflow path and a center axis of the outflow path are connected linearly when viewed from above.

8. The discharge mechanism according to claim 1, wherein a center axis of the inflow path and a center axis of the outflow path are connected at an angle formed therebetween when viewed from above.

9. A liquid material discharge device comprising:
- the discharge mechanism according to claim 1;
- a container that stores a liquid mixed with solid particles;
- a pump that feeds the liquid mixed with the solid particles under pressure; and
- liquid pipes through which the discharge mechanism, the container, and the pump are connected to form a circulation path.

10. The liquid material discharge device according to claim 9, wherein an inflow path of the discharge mechanism and the pump are connected through a plurality of regulators, and an outflow path of the discharge mechanism and the container are connected through a regulator.

11. The discharge mechanism according to claim 1, further comprising a discharge block including the inflow path and the outflow path, which are connected to liquid pipes by fixtures, and the liquid chamber therein.

12. The discharge mechanism according to claim 2, wherein a center axis of the inflow path and a center axis of the outflow path are connected linearly when viewed from above.

13. The discharge mechanism according to claim 2, wherein a center axis of the inflow path and a center axis of the outflow path are connected at an angle formed therebetween when viewed from above.

14. The discharge mechanism according to claim 2, further comprising a discharge block including the inflow path and the outflow path, which are connected to liquid pipes by fixtures, and the liquid chamber therein.

15. A liquid material discharge device comprising:
- the discharge mechanism according to claim 2;
- a container that stores a liquid mixed with solid particles;
- a pump that feeds the liquid mixed with the solid particles under pressure; and liquid pipes through which the discharge mechanism, the container, and the pump are connected to form a circulation path.

16. A liquid material discharge device comprising:
the discharge mechanism according to claim 3;
a container that stores a liquid mixed with solid particles;
a pump that feeds the liquid mixed with the solid particles under pressure; and
liquid pipes through which the discharge mechanism, the container, and the pump are connected to form a circulation path.

17. A liquid material discharge device comprising:
the discharge mechanism according to claim 4;
a container that stores a liquid mixed with solid particles;
a pump that feeds the liquid mixed with the solid particles under pressure; and
liquid pipes through which the discharge mechanism, the container, and the pump are connected to form a circulation path.

18. A liquid material discharge device comprising:
the discharge mechanism according to claim 5;
a container that stores a liquid mixed with solid particles;
a pump that feeds the liquid mixed with the solid particles under pressure; and
liquid pipes through which the discharge mechanism, the container, and the pump are connected to form a circulation path.

19. A liquid material discharge device comprising:
the discharge mechanism according to claim 6;
a container that stores a liquid mixed with solid particles;
a pump that feeds the liquid mixed with the solid particles under pressure; and
liquid pipes through which the discharge mechanism, the container, and the pump are connected to form a circulation path.

20. A liquid material discharge device comprising:
the discharge mechanism according to claim 11;
a container that stores a liquid mixed with solid particles;
a pump that feeds the liquid mixed with the solid particles under pressure; and
liquid pipes through which the discharge mechanism, the container, and the pump are connected to form a circulation path.

21. The discharge mechanism according to claim 1, wherein the conical surface is constituted by a slope inclined at the same angle as an angle formed by a lower surface of the outflow path and a horizontal plane such that the conical surface and the outflow path are connected to each other substantially without a level difference.

22. The discharge mechanism according to claim 1, wherein the inflow path, the outflow path and the liquid chamber are formed in the shape of a three-pronged fork.

23. The discharge mechanism according to claim 1, wherein the valve seat and the nozzle are detachably fixed to a lower end of the liquid chamber with a cap-like member.

24. The discharge mechanism according to claim 23, wherein the nozzle includes a tubular member having a discharge port.

* * * * *